July 5, 1955 F. A. BURNOR ET AL 2,712,469
GRAPPLES FOR STORAGE BATTERY CELL CARRYING
Filed May 2, 1952

FRED A. BURNOR
GLENN E. McKINLEY
Inventors

By

Attorney

United States Patent Office 2,712,469
Patented July 5, 1955

2,712,469

GRAPPLES FOR STORAGE BATTERY CELL CARRYING

Fred A. Burner and Glenn E. McKinley, Toledo, Ohio

Application May 2, 1952, Serial No. 285,652

2 Claims. (Cl. 294—81)

This invention relates to self-gripping or locking pick-up devices, especially for manual use.

This invention has utility more particularly for engaging wet battery terminals, say for withdrawing from a case, as the electrical conductor leads are disconnected, and also for placing a battery in a case, even for installing relation in a motor vehicle.

Referring to the drawings.

Figure 1:
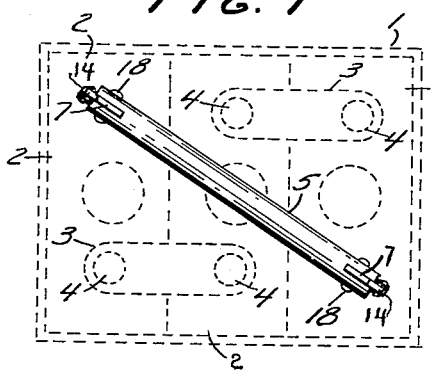
Fig. 1 is a plan view of an embodiment of the invention in pick-up relation with a three cell electric battery.
Figure 5:
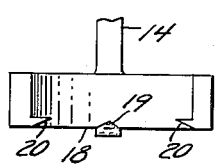
Fig. 5 is a view, on a larger scale, from the line V—V, Fig. 3, looking into one of the jaws of this grapple device.
Figure 6:
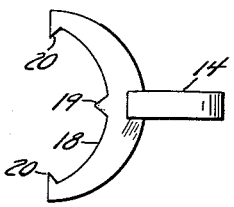
Fig. 6 is a bottom plan view of the jaw of Fig. 5.
Figure 2:
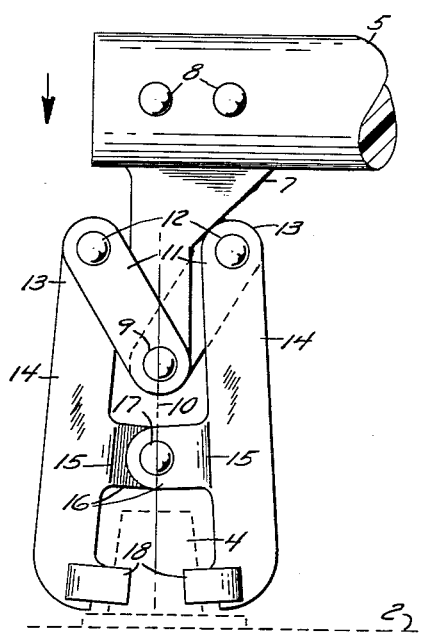
Fig. 2 is an enlarged side elevation of the left end portion of the pick-up device or grapple of Fig. 1, at down-thrust position, in self-opening showing for the pair of jaws in spanning location about a battery terminal.
Figure 3:
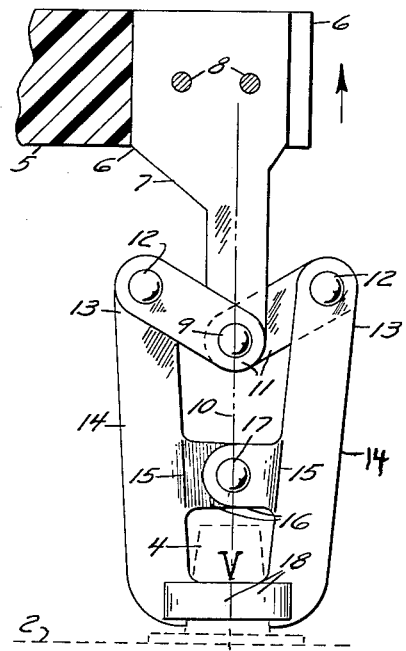
Fig. 3 is a similarly enlarged view in side elevation of the right end position of the device of Fig. 1, but at the initial pull-up, showing the automatic gripping of the battery terminal by the pair of jaws.
Figure 4:
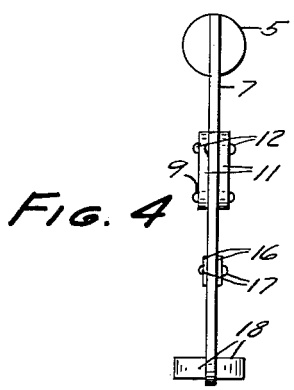
Fig. 4 is a somewhat smaller scale and looking from the right into the device of Fig. 3, being an end elevation.

In a battery case 1, there is shown grouped in wider side abutting relation three cells 2 of a six volt battery, say of a type used in automobiles. Connectors 3 from terminals 4 of the intermediate cell 2 assemble the cells with the diagonally disposed terminals of the end cells exposed for conductor clamp connector upon installation of the battery for current delivery or charging. In some instances, battery cell narrow sides abut, instead of the wider sides, thereby having greater spacing between the diagonally disposed or end terminals for the pick-up.

The device or tool proper comprises a rigid handle or grip 5, which may be of plastic or other electrical insulation material to avoid short-circuiting between positive and negative terminals 4 in placing or removing a wet cell battery which may be under charge, or have some residual charge therein. Aligned end slots 6 in the handle 5 provide seats for rigid brackets 7 to be there anchored, as by rivets 8. The brackets 7 depend in parallel to locate pivot bearings 9 at the spacing of the terminals 4 and centrally of axis lines 10 from such terminals 4.

On the bearing 9 of each bracket 7 is a link 11, one on each side of the bracket 7 in forming a toggle. The free or remote end of each link 11 has a pivot bearing 12 for an upper end 13 of a lever 14. Intermediate the length of each lever 14 is an offset 15 about half the thickness of the bracket 7 at the bearing 9, for an arm 16 to a sort of floating fulcrum 17 connecting the arms 16 of a pair of the levers 14. The levers 14, 15, are of general T-shape in which the downwardly extending major portion 14 is the T-bar, and the intermediate portion 15 or arm is the stem of such T-shape. The pair of links 11, in which the supporting bearing 9 moves away from the fulcrum bearing 17, have outward thrust toggle action at maximum mechanical advantage as jaws 18 are moved to work-engaging position.

Each lever 14 more remote from the bearing 12 than the arm 16, has an arc-shaped jaw 18, say in a range of slightly less than 180°. Near the lower or more remote portion of the jaw seat 18 are impinging points 19, 20. The terminals 4 in normal wet battery practice are of lead, or an alloy of sufficient softness that the points 19, 20, may indent sufficiently to avoid ready slippage.

Importance resides in designing the handle 5 to locate the axis lines 10 of the terminals 4 to be gripped for medially intersecting the bearings 9. From this it follows, in down-thrust of the handle 5, each terminal 4 to be engaged has the lever fulcrum 17 approximate lying in such axes 10. Upon riding astride the terminals, the normal down-hang or gravity of the toggle support, the levers 14 have an upthrust in spreading the jaw pairs 18 to lodge at the bases of and surround the terminals 4. This normal weight of the levers 14 on the tops of the cells 2 is a lag in the initial lifting of the handle 5. The points 19, 20, at once engage and the toggle links 11 effect positive grabbing of the terminals 4 by the jaws 18.

It is to be noted that the pair of links 11 are on opposite sides of the bracket 7 with the supporting bearing 9 extending thru the bracket 7 in providing a common mounting. Then by having each pivotal connection 12 extend toward the plane of the bracket 7 the major portions of the links 14 are co-planar not only with each other, but with the bracket 7. These are factors for centralizing load transmission from the jaws 18 to the grip 5. This symmetry for operation contributes very materially to the ease for placing and removing cell groupings from cases therefor. The snug relation between the case and cell grouping means that any out-of-line directing action causes binding and defeats ease for operation.

There is advantage in locating the impinging points 19, 20, in proximity to the down reach or larger diameter of the terminal 4, that point snagging occurs forthwith with the concave large jaw face area at once riding to embrace the terminal 4 in a firm holding therefor.

The link and lever assembly is such that as the jaws 18 are moved toward the supporting bearing 9, the floating fulcrum 17 approaches the bearing 9 to cause the links 11 to swing on the bearing 9 for the pivotal connections 12 to approach. There thus results a rocking of the respective levers 14 on the floating fulcrum 17 for the jaws 18 to open or increase the clearance therebetween. Conversely, as the jaws 18, or rather the fulcrum 17 has its spacing increase as to the bearing 9, the levers 14 are rocked reversely to swing the jaws 18 toward each other into object embracing and holding position as to the terminal 4 seated therein.

What is claimed and it is desired to secure by Letters Patent is:

1. A grapple grip having forked ends, a rigid bracket fixed in each of said forked ends and terminating in a supporting bearing axially transverse of the grip direction extent, a link on each side of each bearing, said links diverging in extent to upper free end bearings, T-levers co-planar with the brackets, each T-lever comprising a cross bar and a stem, with a cross bar connected to the free upper end bearing of a link with the bar extending downwardly therefrom, the T-lever cross bar lower ends forming jaws, arms formed by the T-lever stem intermediate portions overlapping, and floating fulcrum bearings relatively swingable toward and from each other and assembling the overlapping arm end portions for jaw pairs to oppose and move to align into work gripping relation upon increasing divergence between the links upper free end bearings by lifting the grip to move the supporting bearings away from the fulcrum bearings in increasing the mechanical advantage for the links on the jaws.

2. A grapple grip having forked ends, a rigid bracket fixed in each of said forked ends and terminating in a supporting bearing axially transverse of the grip direction extent, a link on each side of each bearing, said links diverging in extent to free upper end bearings, levers coplanar with the brackets, each lever having a first arm connected to the free upper end of a link and downwardly therefrom a lever second arm to a jaw intermediate said arms, said levers having overlapping portions, and floating fulcrum bearings relatively swingable toward and from each other and assembling the overlapping portions for jaw pairs to oppose and move to align in work gripping relation upon increasing divergence between the links upper free end bearings by lifting the grip to move the supporting bearings away from the fulcrum bearings in increasing the mechanical advantage for the links on the jaws.

References Cited in the file of this patent

UNITED STATES PATENTS

| | | |
|---|---|---|
| 327,575 | Mitchell | Oct. 6, 1885 |
| 1,220,899 | Sorensen | Mar. 27, 1917 |
| 1,628,563 | Taylor | May 10, 1927 |
| 2,350,890 | Hartley | June 6, 1944 |

FOREIGN PATENTS

| | | |
|---|---|---|
| 41,592 | Norway | July 6, 1925 |